(12) United States Patent
Reshef

(10) Patent No.: US 12,010,625 B2
(45) Date of Patent: Jun. 11, 2024

(54) APPARATUS, SYSTEM, AND METHOD OF WAKING UP A COMPUTING DEVICE BASED ON WIRELESS SENSING

(71) Applicant: INTEL CORPORATION, Santa Clara, CA (US)

(72) Inventor: Ehud Reshef, Qiryat Tivon (IL)

(73) Assignee: INTEL CORPORATION, Santa Clara, CA (US)

(*) Notice: Subject to any disclaimer, the term of this patent is extended or adjusted under 35 U.S.C. 154(b) by 569 days.

(21) Appl. No.: 17/132,110

(22) Filed: Dec. 23, 2020

(65) Prior Publication Data

US 2021/0168722 A1      Jun. 3, 2021

(51) Int. Cl.
*H04W 52/02* (2009.01)
*H04L 12/12* (2006.01)

(52) U.S. Cl.
CPC ......... *H04W 52/0245* (2013.01); *H04L 12/12* (2013.01)

(58) Field of Classification Search
CPC ........................... H04W 52/0245; H04L 12/12
See application file for complete search history.

(56) References Cited

U.S. PATENT DOCUMENTS

| | | | | |
|---|---|---|---|---|
| 9,191,890 B2* | 11/2015 | Jafarian | ............ | H04W 52/0209 |
| 9,439,091 B2* | 9/2016 | Tian | ................... | H04W 74/0825 |
| 9,743,351 B2* | 8/2017 | Jafarian | ............ | H04W 52/0212 |
| 9,867,082 B2* | 1/2018 | Kenney | ............... | H04L 27/2601 |
| 10,123,266 B2* | 11/2018 | Wang | ................ | H04W 52/0206 |
| 10,772,056 B2* | 9/2020 | Balakrishnan | ...... | H04W 56/001 |
| 10,827,429 B2* | 11/2020 | Park | ........................ | H04L 27/02 |
| 10,871,815 B2* | 12/2020 | Gossain | ................. | H04L 65/60 |
| 10,873,909 B1* | 12/2020 | Chu | ................... | H04W 52/0229 |
| 10,924,998 B2* | 2/2021 | Park | ...................... | H04W 80/02 |
| 11,451,424 B2* | 9/2022 | Jang | .................. | H04W 72/0446 |
| 11,553,426 B2* | 1/2023 | Kim | ....................... | H04W 74/08 |

(Continued)

FOREIGN PATENT DOCUMENTS

EP         4020823 A1 *  6/2022  ............... H04B 1/18

OTHER PUBLICATIONS

"Wi-Fi Sensing, A New Technology Emerges", Wireless Broadband Alliance, WBA Wi-Fi Sensing Group, Oct. 2019, Version 1.0, 53 pages.

(Continued)

*Primary Examiner* — Hai V Nguyen
(74) *Attorney, Agent, or Firm* — Shichrur & Co.

(57) ABSTRACT

For example, an apparatus may be configured to maintain user device information to identify one or more user devices of a user of a computing device; to determine, when the computing device is at a low power mode of operation, that a detected user device of the one or more user devices is within a user detection range from the computing device based on a wireless signal from the user device; based on determination that the user device is within the user detection range from the computing device, to trigger a wireless proximity sensing to detect whether the user is within a wakeup range from the computing device; and based on detection that the user is within the wakeup range from the computing device, to trigger the computing device to wakeup from the low power mode.

25 Claims, 4 Drawing Sheets

(56) References Cited

U.S. PATENT DOCUMENTS

| | | | | |
|---|---|---|---|---|
| 11,614,785 | B2* | 3/2023 | Gossain | H04W 52/0235 713/320 |
| 11,703,582 | B2* | 7/2023 | Trainin | G01S 13/325 342/134 |
| 2013/0235773 | A1* | 9/2013 | Wang | H04W 52/0206 370/311 |
| 2013/0343247 | A1* | 12/2013 | Kasher | H04W 52/0209 370/328 |
| 2014/0119410 | A1* | 5/2014 | Tian | H04B 1/707 375/147 |
| 2014/0211678 | A1* | 7/2014 | Jafarian | H04W 68/02 370/311 |
| 2014/0254349 | A1* | 9/2014 | Jia | H04W 28/0252 370/216 |
| 2015/0071215 | A1* | 3/2015 | Tian | H04W 52/0229 370/329 |
| 2015/0131527 | A1* | 5/2015 | Kenney | H04L 27/2613 370/328 |
| 2016/0157046 | A1* | 6/2016 | Weizman | H04W 48/16 370/252 |
| 2016/0277170 | A1* | 9/2016 | Jia | H04L 47/34 |
| 2017/0280388 | A1* | 9/2017 | Asterjadhi | H04W 52/0229 |
| 2017/0280498 | A1* | 9/2017 | Min | H04W 52/0229 |
| 2018/0131587 | A1* | 5/2018 | Patil | H04W 88/02 |
| 2018/0234918 | A1* | 8/2018 | Asterjadhi | H04W 52/0216 |
| 2018/0310247 | A1* | 10/2018 | Chu | H04W 52/0235 |
| 2019/0082390 | A1* | 3/2019 | Azizi | H04L 5/0007 |
| 2019/0191376 | A1* | 6/2019 | Kim | H04W 74/06 |
| 2019/0191377 | A1* | 6/2019 | Park | H04W 52/0274 |
| 2019/0200298 | A1* | 6/2019 | Park | H04L 27/2607 |
| 2019/0273647 | A1* | 9/2019 | Shellhammer | H04L 27/2331 |
| 2020/0092811 | A1* | 3/2020 | Park | H04L 27/04 |
| 2020/0106651 | A1* | 4/2020 | Park | H04L 27/2628 |
| 2020/0137686 | A1* | 4/2020 | Cao | H04W 52/0235 |
| 2020/0351772 | A1* | 11/2020 | Homchaudhuri | H04W 48/08 |
| 2020/0351789 | A1* | 11/2020 | Homchaudhuri | H04L 43/067 |
| 2021/0044407 | A1* | 2/2021 | Lomayev | H04L 25/0202 |
| 2021/0092678 | A1* | 3/2021 | Kim | H04W 74/06 |
| 2021/0127333 | A1* | 4/2021 | Park | H04L 27/02 |
| 2021/0173065 | A1* | 6/2021 | Trainin | G01S 13/325 |
| 2021/0311162 | A1* | 10/2021 | Mai | G01S 7/415 |
| 2021/0368443 | A1* | 11/2021 | Park | H04L 27/26134 |
| 2021/0391961 | A1* | 12/2021 | Cao | H04L 1/08 |
| 2022/0030625 | A1* | 1/2022 | Yang | H04L 5/001 |
| 2022/0150015 | A1* | 5/2022 | Liu | H04L 25/0202 |
| 2022/0201603 | A1* | 6/2022 | Klein | H04L 27/0002 |
| 2022/0346009 | A1* | 10/2022 | Song | H04W 52/0229 |
| 2023/0208474 | A1* | 6/2023 | Rubin | H04B 5/24 455/41.1 |
| 2023/0209377 | A1* | 6/2023 | Parker | H04L 25/0226 455/67.13 |
| 2023/0319875 | A1* | 10/2023 | Kim | H04W 74/0808 |
| 2023/0362990 | A1* | 11/2023 | Jang | H04L 5/003 |
| 2023/0384437 | A1* | 11/2023 | Trainin | G01S 13/42 |
| 2023/0421179 | A1* | 12/2023 | Aldana | H03M 13/6527 |

OTHER PUBLICATIONS

Bluetooth Core Specification V 5.0, Dec. 6, 2016, 2822 pages.

IEEE Std 802.11™—2016. IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016, 3534 pages.

* cited by examiner

APPARATUS, SYSTEM, AND METHOD OF WAKING UP A COMPUTING DEVICE BASED ON WIRELESS SENSING

TECHNICAL FIELD

Aspects described herein generally relate to waking up a computing device based on wireless sensing.

BACKGROUND

Wireless sensing is a term given to a usage of wireless technology to perform radar-like applications. For example, wireless sensing may be used to detect motion in a room, for example, to detect when a person approaches a target device.

The wireless sensing may be implemented by a wireless communication device, which is capable to receive wireless signals, for example, to detect changes in an environment where the wireless signals propagate.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
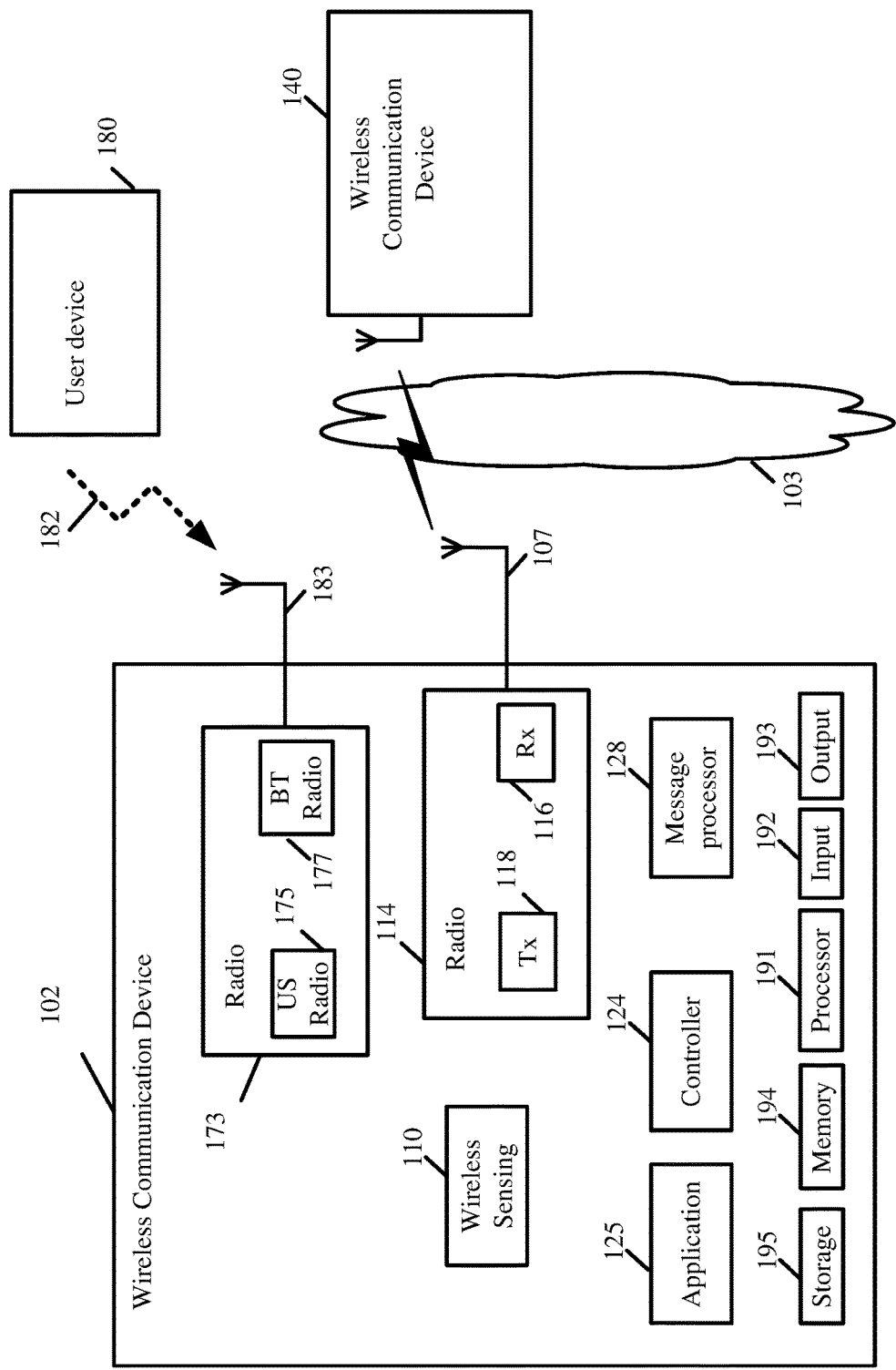
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a wireless station (STA), a User Equipment (UE), a Bluetooth device, a Bluetooth Low Energy (BLE) device, a Mobile Device (MD), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2016 (IEEE 802.11-2016, IEEE Standard for Information technology—Telecommunications and information exchange between systems Local and metropolitan area networks—Specific requirements Part 11: Wireless LAN Medium Access Control (MAC) and Physical Layer (PHY) Specifications, Dec. 7, 2016), and/or IEEE 802.11bf (IEEE 802.11bf Amendment: Wireless Local Area Sensing (SENS))) and/or future versions and/or derivatives thereof, devices and/or networks operating in accordance with existing WFA Peer-to-Peer (P2P) specifications (WiFi P2P technical specification, version 1.7, Jul. 6, 2016) and/or future versions and/or derivatives thereof, devices and/or networks operating in accordance with existing cellular specifications and/or protocols, e.g., 3GPP Long Term Evolution (LTE), and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra Red (IR), Frequency-Division Multiplexing (FDM), Orthogonal FDM (OFDM), Orthogonal Frequency-Division Multiple Access (OFDMA), Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), Extended GPRS, Code-Division Multiple Access (CDMA), Wideband CDMA (WCDMA), CDMA 2000, single-carrier CDMA, multi-carrier CDMA, Multi-Carrier Modulation (MCM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE Advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that is integrated with a computer, or a peripheral that is attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a frequency band of 2.4 GHz, or 5 GHz. Other aspects may be implemented utilizing any other suitable wireless communication frequency bands, for example, an Extremely High Frequency (EHF) band (the millimeter wave (mmWave) frequency band), for example, a frequency band within the frequency band of between 20 GHz and 300 GHz, e.g., a frequency band above 45 Ghz, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is now made to FIG. 1, which schematically illustrates a block diagram of a system 100, in accordance with some demonstrative aspects.

As shown in FIG. 1, in some demonstrative aspects, system 100 may include a wireless communication network including one or more wireless communication devices, e.g., a computing device 102, and/or at least one wireless communication device 140.

In some demonstrative aspects, computing device 102 may include, for example, a UE, an MD, a STA, a PC, a Smartphone, a desktop computer, a mobile computer, a laptop computer, an Ultrabook™ computer, a notebook computer, a tablet computer, a handheld computer, a consumer device, a vehicular device, a non-vehicular device, a mobile or portable device, a non-mobile or non-portable device, a mobile phone, a cellular telephone, a non-desktop computer, an Ultra Mobile PC (UMPC), a Mobile Internet Device (MID), an "Origami" device or computing device, a device that supports Dynamically Composable Computing (DCC), a video device, an audio device, an A/V device, a video source, an audio source, a video sink, an audio sink, a gaming device, a television, a music player, or the like.

In some demonstrative aspects, device 102 and/or device 140 may include, operate as, and/or perform the functionality of one or more STAs. For example, device 102 may include at least one STA, and/or device 140 may include at least one STA.

In some demonstrative aspects, device 102 and/or device 140 may include, operate as, and/or perform the functionality of one or more WLAN STAs.

In some demonstrative aspects, device 102 and/or device 140 may include, operate as, and/or perform the functionality of one or more Wi-Fi STAs.

In one example, a station (STA) may include a logical entity that is a singly addressable instance of a medium access control (MAC) and physical layer (PHY) interface to the wireless medium (WM). In another example, a STA may include a multiplicity of logical entities each being a singly addressable instance of a MAC and PHY interface to the WM. The STA may perform any other additional or alternative functionality. In another example, the STA may include a logical entity that is capable of multi-link operation, e.g., in accordance with an IEEE 802.11be Specification. The STA may perform any other additional or alternative functionality.

In some demonstrative aspects, device 102 and/or device 140 may include, operate as, and/or perform the functionality of, any other devices and/or STAs.

In some demonstrative aspects, device 102 may include a STA and/or device 140 may include an access point (AP) STA.

In one example, device 102 may be configured to operate as, perform one or more operations of, and/or to perform the functionality of, a non-AP STA; and/or device 140 may be configured to operate as, and/or to perform the functionality of, an AP STA.

In one example, an AP may include an entity that contains a station (STA), e.g., one STA, and provides access to distribution services, via the wireless medium (WM) for associated STAs. The AP may perform any other additional or alternative functionality.

In one example, a non-AP STA may include a STA that is not contained within an AP. The non-AP STA may perform any other additional or alternative functionality.

In some demonstrative aspects, device 102 and/or device 140 may include, for example, one or more of a processor 191, an input unit 192, an output unit 193, a memory unit 194, and/or a storage unit 195. Device 102 may optionally include other suitable hardware components and/or software components. In some demonstrative aspects, some or all of the components of device 102 may be enclosed in a common housing or packaging, and may be interconnected or operably associated using one or more wired or wireless links. In other aspects, components of device 102 may be distributed among multiple or separate devices.

In some demonstrative aspects, processor 191 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 executes instructions, for example, of an Operating System (OS) of device 102 and/or of one or more suitable applications.

In some demonstrative aspects, input unit 192 may include, for example, a keyboard, a keypad, a mouse, a touch-screen, a touch-pad, a track-ball, a stylus, a microphone, or other suitable pointing device or input device. Output unit 193 includes, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 includes, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102.

In some demonstrative aspects, computing device 102 may be capable of communicating content, data, information and/or signals via a wireless medium (WM) 103.

In some demonstrative aspects, wireless medium 103 may include, for example, a radio channel, a channel, a WiFi channel, a cellular channel, a Global Navigation Satellite System (GNSS) Channel, an RF channel, an IR channel, and the like.

In some demonstrative aspects, wireless communication medium 103 may include a 2.4 GHz frequency band, and/or one or more other wireless communication frequency bands, for example, a 5 GHz frequency band, a 6 GHz frequency band, a millimeterWave (mmWave) frequency band, e.g., a frequency band above 45 GHz, a Sub-1 GHz (S1G) band, and/or any other frequency band.

In some demonstrative aspects, devices 102 and/or 140 may include one or more radios including circuitry and/or logic to perform wireless communication between devices 102, 140 and/or one or more other devices. For example, device 102 and/or device 140 may include at least one radio 114.

In some demonstrative aspects, radio 114 may include a WLAN radio configured to communicate WLAN communications, e.g., WLAN packets.

In some demonstrative aspects, radio 114 may include one or more wireless receivers (Rx) including circuitry and/or logic to receive wireless communication signals, RF signals, frames, blocks, transmission streams, packets, messages, data items, and/or data. For example, radio 114 may include at least one receiver 116.

In some demonstrative aspects, radio 114 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118.

In some demonstrative aspects, radio 114, transmitter 118, and/or receiver 116 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like.

In some demonstrative aspects, radio 114 may be configured to communicate over a 2.4 GHz, a 5 GHz band, a 6 GHz band, a band above 45 Ghz, an S1Gb and, and/or any other band.

In some demonstrative aspects, radio 114 may include, or may be associated with, one or more antennas.

In one example, device 102 may include a single antenna 107. In another example, device 102 may include two or more antennas 107.

Antennas 107 may include any type of antennas suitable for transmitting and/or receiving wireless communication signals, blocks, frames, transmission streams, packets, messages and/or data. For example, antennas 107 may include any suitable configuration, structure and/or arrangement of one or more antenna elements, components, units, assemblies and/or arrays. In some aspects, antennas 107 may implement transmit and receive functionalities using separate transmit and receive antenna elements. In some aspects, antennas 107 may implement transmit and receive functionalities using common and/or integrated transmit/receive elements.

In some demonstrative aspects, device 102 may include a controller 124 configured to perform and/or to trigger, cause, instruct and/or control device 102 to perform, one or more functionalities, operations and/or procedures, for example, to generate and/or communicate one or more messages and/or transmissions between devices 102, 140, and/or one or more other devices, e.g., as described below.

In some demonstrative aspects, controller 124 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controller 124. Additionally or alternatively, one or more functionalities of controller 124 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114.

In other aspects, the functionality of controller 124 may be implemented as part of any other element of device 102.

In some demonstrative aspects, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), e.g., a PHY Layer Convergence Procedure (PLCP) PDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, message processor 128 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, BB circuitry and/or logic, a BB processor, a BB memory, AP circuitry and/or logic, an AP processor, an AP memory, and/or any other circuitry and/or logic, configured to perform the functionality of message processor 128. Additionally or alternatively, one or more functionalities of message processor 128 may be implemented by logic, which may be executed by a machine and/or one or more processors, e.g., as described below.

In some demonstrative aspects, at least part of the functionality of message processor 128 may be implemented as part of radio 114.

In some demonstrative aspects, at least part of the functionality of message processor 128 may be implemented as part of controller 124.

In other aspects, the functionality of message processor 128 may be implemented as part of any other element of device 102.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other aspects, controller 124, message processor 128 and/or radio 114 may be implemented by one or more additional or alternative elements of device 102.

In some demonstrative aspects, device 102 and/or device 140 may include, operate as, perform the role of, and/or perform one or more functionalities of, one or more STAs.

In some demonstrative aspects, device 102 and/or device 140 may form, or may communicate as part of, a wireless local area network (WLAN).

In some demonstrative aspects, device 102 and/or device 140 may form, or may communicate as part of, a WiFi network.

In other aspects, device 102 and/or device 140 may form, and/or communicate as part of, any other additional or alternative network.

In some demonstrative aspects, device 102 may be configured to perform wireless sensing, e.g., as describe below.

In some demonstrative aspects, wireless sensing (also referred to as "WLAN sensing" or "Wi-Fi sensing") may refer to a term given to a usage of wireless technology to detect changes in an environment of a device, e.g., an environment of device 102, for example, based on received wireless signals, e.g., signals received by device 102, for example, from one or more other devices, e.g., including device 140.

In some demonstrative aspects, the environment of the device 102 may include an area around the device, e.g., within at least a few centimeters or meters from the device 102. The area may include a room, a house, an enterprise, and the like.

In some demonstrative aspects, WLAN sensing technology may utilize Physical Layer (PHY) and/or Medium Access Control (MAC) features of a WLAN STA, e.g., an IEEE 802.11 station and/or any other type of wireless station, to obtain channel measurements that characterize the environment in which the station operates.

In some demonstrative aspects, measurements obtained with WLAN sensing may be used to enable and/or support applications such as, for example, presence detection, proximity detection, device-free positioning, gesture classification, and/or biometric measurements, among many others.

In one example, the wireless sensing may include performing radar-like applications. For example, wireless sensing may be used to detect motion in a room, for example, to detect when a person approaches a target device.

In some demonstrative aspects, the wireless sensing may be configured to detect one or more features in the environment, for example, a motion, a presence or proximity, a gesture, a people count, a geometry, a velocity, and/or the like.

In some demonstrative aspects, the wireless sensing may be configured to detect a target in the environment, for example, an object, a human, an animal, and/or the like.

In some demonstrative aspects, the wireless sensing may be used by a wireless sensing device, e.g., device 102, which is capable to receive wireless signals, for example, in order to detect changes in an environment, e.g., where the wireless signals propagate.

In some demonstrative aspects, a wireless sensing device, e.g., device 102, may be configured to perform the wireless sensing, for example, by tracking a channel state of a wireless communication channel, which may be obtained, for example, when decoding a plurality of received wireless packets over time, for example, in order to detect changes, which may indicate an event of interest.

In some demonstrative aspects, the channel state may include one or more parameters of the wireless communication channel, which may be estimated by a receiver based on one or more fields in one or more packets.

In one example, the channel state of the wireless communication channel may be determined based on a Channel Frequency Response (CFR) of the wireless communication channel.

In another example, the channel state of the wireless communication channel may be determined based on a Channel State Information (CSI) of the wireless communication channel.

In another example, the channel state of the wireless communication channel may be determined based on a Signal to Noise Ratio (SNR) of the wireless communication channel.

In another example, the channel state of the wireless communication channel may be determined based on a Received Signal Strength Indicator (RSSI) of the wireless communication channel.

In other aspects, the channel state of the wireless communication channel may be determined based on any other additional or alternative measurements, estimations and/or parameters.

In some demonstrative aspects, the wireless sensing device, e.g., device 102, may detect variations in the received wireless packets, which may indicate a change in the environment, for example, a motion in the environment.

In some demonstrative aspects, device 102 may include a wireless sensing component (also referred to as "WLAN sensor", "wireless sensing processor" or "wireless sensor") 110 configured to sense changes in an environment of device 102, for example, based on wireless communication technology, e.g., as described below.

In some demonstrative aspects, wireless sensing component 110 may be configured to perform one or wireless sensing measurements, operations and/or communications, e.g., as described below.

In some demonstrative aspects, wireless sensing processor 110 may be configured to detect the one or more changes in the environment of device 102, for example, to detect a motion in the environment of device 102, e.g., as described below.

Some demonstrative aspects are described herein with respect to a wireless sensing component, e.g., wireless sensing processor 110, configured to perform measurements for motion detection. However, in other aspects, the wireless sensor may be configured to perform any other additional or alternative type of wireless sensing, e.g., to detect any other changes in the environment and/or for any other suitable wireless sensing applications.

In some demonstrative aspects, wireless sensing component 110 may include, or may be implemented, using suitable circuitry and/or logic, e.g., controller circuitry and/or logic, processor circuitry and/or logic, memory circuitry and/or logic, and/or any other circuitry and/or logic, which may be configured to perform at least part of the functionality of wireless sensor 110. Additionally or alternatively, one or more functionalities of wireless sensing processor 110 may be implemented by logic, which may be executed by a machine and/or one or more processors, e.g., as described below.

In one example, WLAN sensor 110 may include circuitry and/or logic, for example, one or more processors including circuitry and/or logic, to cause, trigger and/or control a computing device, e.g., device 102, and/or a wireless station, e.g., a wireless STA implemented by device 102, to perform one or more operations, communications and/or functionalities for wireless sensing, e.g., as described herein. In one example, wireless sensing processor 110 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, wireless sensor 110 may be implemented by, and/or configured to perform one or more operations of, and/or at least part of the functionality of, message processor 128 and/or controller 124, for example, to trigger and/or process communications and/or transmissions of one or more wireless sensing messages and/or wireless sensing signals.

In some demonstrative aspects, controller 124 may be configured to implement a "Wake on human proximity" (also referred to as "Wake on user proximity") mechanism, for example, to selectively wake up device 102 from a low-power mode, for example, based on detected proximity of a user of device 102, e.g., as described below.

For example, the "Wake on User Proximity" mechanism may be configured to wakeup a computing platform, e.g., device 102, for example, even before a user of the computing platform is nearby. Accordingly, the "Wake on User Proximity" mechanism may provide the user with a "zero wait" User Experience (UX), for example, for platform wakeup and/or login.

In one example, the "Wake on human proximity" mechanism may be configured to provide an improved user experience, e.g., compared to a "wait for user action" wakeup mechanism. For example, the "Wake on human proximity" mechanism may be configured to wakeup device 102 in advance, e.g., before the user interacts with a user interface of device 102. Accordingly, the "Wake on human proximity" mechanism may support reducing user wait time for device 102 to wake up from standby/sleep mode.

In some demonstrative aspects, device 102 may be configured to implement a power management mechanism, for example, to reduce power usage, e.g., when a user of device 102 has stepped away from, or has stopped using, device 102 for a period of time.

In some demonstrative aspects, device 102 may be configured to enter into several power modes (states), which may range from device 102 being fully operational (fully-active state) to device 102 being asleep (sleep state, power-saving state, etc.).

In some demonstrative aspects, controller 124 may be configured to wake up device 102 from a low power mode to a higher power mode, which may have higher power usage compared to the low power mode.

In one example, the low power mode may include, for example, an S3, S2, or S1 sleep power state, e.g., according to an Advanced Configuration and Power Interface (ACPI) power management mechanism.

In another example, the low power mode may include, for example, an S0ix power state, e.g., according to the ACPI power management mechanism.

In other aspects, and other low power mode may be utilized.

In one example, the low power mode may include a first low power mode, and the higher power mode may include a second low power mode.

In another example, the higher power mode may include an active power mode.

In another example, the higher power mode may include an intermediate power mode, e.g., between the low power mode and the active power mode.

In some demonstrative aspects, controller 124 may be configured to selectively wake up device 102 from the low power mode, for example, based on a proximity detection by wireless sensing component 110, e.g., as described below.

For example, wireless sensing component 110 may be configured to detect user proximity to device 102, for example, based on wireless sensing, for example, based on channel estimation measurements corresponding to a plurality of Physical layer Protocol Data Units (PPDUs) received by device 102 over a wireless communication channel.

In some demonstrative aspects, the plurality of PPDUs may include, for example, WLAN PPDUs received by a WLAN radio of device 102, e.g., radio 114. For example, wireless sensing component 110 may be configured to process Wi-Fi Channel State Information (CSI) based on the WLAN PPDUs, for example, to detect user proximity.

In some demonstrative aspects, controller 124 may be configured to trigger device 102 to wakeup from the low power mode, for example, based on the user proximity detection by wireless sensing component 110.

In some demonstrative aspects, controller 124 may be configured to trigger device 102 to wakeup from the low power mode, for example, to a power mode, which may be sufficient to allow the device 102 to be ready for the user to log-in to device 102, for example, using a password, or any other user authentication and/or login mechanism.

In some demonstrative aspects, there may be a need to address one or more technical issues with respect to accurate and/or efficient detection of user proximity based on wireless sensing.

For example, an implementation of "wake on human proximity" by a computing platform in a non-user specific manner may inhibit the platform from going to sleep in densely populated environments.

For example, it may be hard to configure a computing device to detect whether a person approaching the computing platform is actually a user of the computing platform or another person. This may potentially result with multiple unnecessary platform wake from sleep events, for example, especially in densely populated environments such as an "open space" environment.

For example, in some use cases and/or scenarios, for example, in crowded environments, e.g., crowded office environments, there may be frequent changes in a WLAN environment. The frequent changes in the WLAN environment may trigger a "wake" operation quite often, e.g., even in many cases where the user of device 102 is not in proximity to the device 102. The often "false detection" situations may result in significant power consumption of device 102, for example, due to unnecessary activation of CPU, screen, camera, and/or other platform components, which may be woken up to be ready to authenticate the user, e.g., although the user of device 102 may not really be in proximity to the device 102.

In some demonstrative aspects, there may be a need for a technical solution, which may reduce an occurrence of, or even avoid, situations where device 102 is to be woken up from the low power mode based on a "false detection" of the user of device 102.

In some cases, it may be feasible to distinguish between different people, e.g. based on gait and/or any other mechanism. However, in order to perform user proximity detection with a high level of accuracy, there may be a need to perform operations, which may consume a large amount of power, e.g., at a level, which may not be supported by the low power mode. In one example, wireless sensing may utilize a plurality of channel estimation measurements, e.g., a set of consecutive CSI measurements, which may be hard to guarantee, for example, when device is at the low power mode, e.g., states S3 or S0ix.

In some demonstrative aspects, controller 124 may be configured to selectively trigger wireless proximity sensing by wireless sensing component 110 based on one or more criteria relating to a possibility that the user of device 102 may be approaching device 102, e.g., as described below.

In some demonstrative aspects, controller 124 may be configured to selectively trigger wireless proximity sensing by wireless sensing component 110 based on a detected approach of the specific user of device 102, e.g., as described below.

In some demonstrative aspects, the selective triggering of wireless proximity sensing by wireless sensing component 110 may provide a technical advantage of supporting an enhanced Wake on WLAN (Wi-Fi) based proximity capability, for example, with reduced platform wake instances. Accordingly, the selective triggering of wireless proximity sensing by wireless sensing component 110 may provide a technical advantage of reducing overall power impact, e.g., in a way which may reduce or even avoid compromising on user experience.

In some demonstrative aspects, the selective triggering of wireless proximity sensing by wireless sensing component 110 may provide a technical solution supporting improved user experience. For example, the selective triggering of wireless proximity sensing by wireless sensing component 110 may support a UX benefit of having device "ready", e.g., when the user is near device 102, for example, while reducing power consumption and/or platform wake events.

In some demonstrative aspects, controller 124 may be configured to selectively trigger wireless proximity sensing by wireless sensing component 110, for example, by limiting wireless proximity sensing by wireless sensing component 110 to times when the user of device 102 is detected to be in the relative area of the device 102, e.g., as described below.

In some demonstrative aspects, controller 124 may be configured to detect whether or not the user of device 102 is in a relative area of device 102, for example, based on a detection of a user device of the user is in a vicinity of the device 102, e.g., as described below.

In some demonstrative aspects, the user device may include a device, which may be assumed to be carried by the user of device 102, e.g., on a regular basis, e.g., as described below.

In some demonstrative aspects, the user device may include a device, which may be assumed to be carried by the user of device 102, for example, when the user interacts with device 102, e.g., as described below.

In some demonstrative aspects, the user device may include, for example, a smartphone of the user, an audio device, e.g., a headset or wireless earphones of the user, a smartwatch, a wearable device, and/or any other device belonging to and/or used by, the user of device 102.

In some demonstrative aspects, controller 124 may be configured to detect whether or not the user of device 102 is in the relative area of device 102, for example, based on detection of wireless signals from the user device, e.g., as described below.

In some demonstrative aspects, controller 124 may be configured to detect whether or not the user of device 102 is in the relative area of device 102, for example, based on detection of Bluetooth (BT) signals from the user device, e.g., as described below.

In some demonstrative aspects, controller 124 may be configured to detect whether or not the user of device 102 is in the relative area of device 102, for example, based on detection of Ultrasonic (US) signals, e.g., an US beacon, from the user device.

In some demonstrative aspects, controller 124 may be configured to detect whether or not the user of device 102 is in the relative area of device 102, for example, based on detection of a wireless signal 182 from any device 180 that could be associated with the person using computing device 102.

In one example, wireless signal 182 may include a well-defined periodic transmission, e.g., a Wi-Fi Aware beacon, from a user Smartphone, Smart Watch, or any other signal from any other personal device.

In other aspects, controller 124 may be configured to detect whether or not the user of device 102 is in the relative area of device 102, for example, based on detection of any other type of wireless signals from the user device.

In some demonstrative aspects, controller 124 may be configured to identify the user device, e.g., a user smartphone, for example, based on a pairing of the user device to the device 102, e.g., by the user, as described below.

In some demonstrative aspects, controller 124 may be configured to identify the user device, based dynamic learning mechanism, e.g., a machine learning mechanism, which may be configured to dynamically identify the user device based on one or more criteria, e.g., as described below.

In some demonstrative aspects, controller 124 may be configured to detect that the user of device 102 is in the vicinity of device 102, for example, by detecting a user device of the user, for example, by detecting a smartphone or another personal device of the user.

In one example, controller 124 may be able to detect the user device based on BT signals form the user device, for example, when the user device is in a range of about 10 meters (m), e.g., in a "free space" environment, or a range of a few meters, e.g., in an environment with intervening walls or cube materials.

In some demonstrative aspects, controller 124 may be configured to, based on detection of the user device of the user of device 102, e.g., the specific user smartphone, initiate the Wi-Fi Sensing proximity service, for example, by triggering WLAN sensor to determine if the user is within a perimeter defined as a "platform wakeup perimeter".

In some demonstrative aspects, controller 124 may be configured to cause device 102 to maintain user device information to identify one or more user devices of a user, for example, including a user device 180, e.g., as described below.

For example, the user device information may be stored by controller 124 in memory 194 and/or any other, e.g., dedicated or shared, memory of device 102, e.g., as described below.

In some demonstrative aspects, controller 124 may be configured to determine that a detected user device of the one or more user devices, e.g., user device 180, is within a user detection range from the computing device 102, for example, when the computing device 102 is at a low power mode of operation, e.g., as described below.

In some demonstrative aspects, controller 124 may be configured to determine that the detected user device 180 is within the user detection range from the computing device 102, for example, based on a wireless signal 182 from the user device, e.g., as described below.

In some demonstrative aspects, controller 124 may be configured to trigger a wireless proximity sensing, for example, based on determination that the user device 180 is within the user detection range from the computing device 102, e.g., as described below.

In some demonstrative aspects, controller 124 may be configured to trigger the wireless proximity sensing to detect whether the user is within a wakeup range from the computing device 102 based on channel estimation measurements corresponding to a plurality of PPDUs received by the computing device 102 over a wireless communication channel, e.g., as described below.

In some demonstrative aspects, the plurality of PPDUs may include a plurality of PPDUs received from one or more other devices, different from the user device 180.

For example, the PPDUs may include PPDUs from device 140 and/or one or more other devices. According to this example, controller 124 may determine that the user device 180 is within the user detection range from the computing device 102, for example, based on the wireless signal 182 from user device 180; and WLAN sensing processor 110 may perform the wireless proximity sensing to detect whether the user is within the wakeup range from the computing device 102 based on channel estimation measurements corresponding to the PPDUs, which may be received from device 140. In one example, wireless proximity sensing may be based on one or more channel estimation measurements, e.g., CSI measurements and/or any other measurements, which may be utilized to detect a person in close proximity, for example, based on detected changes in the channel estimation measurements. For example, it may be determined based on the changes in the channel estimation measurements that a person is close to, or has moved towards, the computing device 102.

In some demonstrative aspects, controller 124 may be configured to trigger WLAN sensor 110 to detect whether the user is within the wakeup range from the computing device 102, for example, based on the determination of controller 124 that that the user device is within the user detection range from the computing device 102, e.g., as described below.

In some demonstrative aspects, controller 124 may be configured to trigger wireless sensing processor 110 to perform wireless proximity sensing to detect whether the user is within the wakeup range from the computing device 102. For example, wireless sensing processor 110 may be configured to perform the wireless sensing based on channel estimation measurements, e.g., CSI measurements, with respect to PPDUs from device 140 and/or one or more other devices, e.g., as described above.

In some demonstrative aspects, for example, radio 114 may include a WLAN radio, and wireless sensing processor 110 to perform wireless proximity sensing based on WLAN PPDUs received by the WLAN radio 114, e.g., from device 140.

In some demonstrative aspects, the wakeup range may be shorter than the user detection range, e.g., as described below.

In some demonstrative aspects, the user detection range may include a range of at least 3 m.

In some demonstrative aspects, the user detection range may include a range of at least 5 m.

In some demonstrative aspects, the user detection range may include a range of at least 7 m.

In some demonstrative aspects, the user detection range may include a range of about 10 m.

In some demonstrative aspects, the wakeup range may include a range of no more than 2 m.

In some demonstrative aspects, the wakeup range may include a range of no more than 1 m.

In other aspects, any other user detection range and/or wakeup range may be implemented.

In some demonstrative aspects, controller 124 may be configured to trigger the computing device 102 to wakeup from the low power mode, for example, based on detection that the user is within the wakeup range from the computing device 102, e.g., as described below.

In one example, controller 124 may be configured to trigger the computing device 102 to wakeup from the low power mode, for example, based on a an indication from WLAN sensor 110 that the user is detected to be within the wakeup range from the computing device 102.

In another example, controller 124 may be configured to process wireless sensing information from WLAN sensor 110 to detect that the user is within the wakeup range from the computing device 102; and, based on the detection that the user is within the wakeup range from the computing device 102, controller 124 may trigger the computing device 102 to wakeup from the low power mode.

In some demonstrative aspects, computing device 102 may include at lest one radio 173, which may be configured to receive the wireless signal 182 from the user device 180, e.g., as described below.

In some demonstrative aspects, device 102 may include a first radio, e.g., radio 173, which may be configured to receive the wireless signal 182 from user device 180; and/or a second radio, e.g., radio 114, which may be configured to receive the plurality of PPDUs for the wireless sensing, e.g., from device 140.

In some demonstrative aspects, the at least one radio 173 may include, or may be associated with, one or more antennas 183.

In one example, antennas 183 may include one or more dedicated antennas, e.g., separated from antennas 107. In another example, antennas 183 and/or 107 may be shared between radio 114 and radio 173.

In some demonstrative aspects, the at least one radio 173 may include a BT radio 177 configured to receive BT signals, e.g., as described below. For example, wireless signal 182 may include a BT signal.

In some demonstrative aspects, the wireless signal 182 may include a Bluetooth Low Energy (BLE) transmission from user device 180. For example, controller 124 may be configured to determine that the user device 180 is within the user detection range from the computing device 120 according to the BLE transmission from the user device 180.

In some demonstrative aspects, it may be advantageous to utilize BT signals for detecting that the user device 180 is within the user detection range from the computing device 102.

For example, BT communication may be supported by many types of mobile user devices, for example, smartphones, BT or BLE Headsets, BT/BLE enabled wearable devices, and the like.

In some demonstrative aspects, utilizing BT signals for detecting that the user device 180 is within the user detection range from the computing device 102 may provide a technical advantage, for example, in terms of system integration, efficiency, compatibility and/or complexity.

For example, at least some BT and WLAN, e.g., WiFi, functions, e.g., of radios 114 and 177, may be integrated by one or more common modules, for example, as part of a common IC. Accordingly, controller 124, the WLAN radio 114 and/or BT radio 177 may be configured to utilize direct communications between the WLAN and BT modules in the common IC, e.g., similar to messaging used for Wi-Fi/BT Coexistence purposes.

In some demonstrative aspects, utilizing BT signals for detecting that the user device 180 is within the user detection range from the computing device 102 may provide a technical advantage, for example, in terms of availability and/or power consumption.

In one example, BLE functionality of a computing device, e.g., computing device 102, may be discoverable, for example, by default or mandatory requirement, e.g., of an operating system of computing device 102.

In another example, controller 124 may be configured to utilize a "Bluetooth low energy proximity profile" to identify whether computing device 102 in proximity to another device, e.g., user device 180. The "Bluetooth low energy proximity profile" may be widely implemented by many types of devices. Accordingly, "Bluetooth low energy proximity profile" may provide an easy and efficient manner to detect user devices, which are in proximity to the computing device 102.

In some demonstrative aspects, the at least one radio 173 may include an US radio 175 configured to receive US signals, e.g., as described below. For example, wireless signal 182 may include an US signal.

In other aspects, the at least one radio 173 may include any other additional or alternative type of radio to receive the wireless signal 182 from user device 180.

In some demonstrative aspects, the wireless signal 182 from the user device 180 may include a scan signal.

For example, controller 124 may be configured to determine that the detected user device 180 is within the user detection range from the computing device 102, for example, based on detection of signal 182 including a scan signal from user device 180. In one example, the scan signal may include a BT scan signal, for example, a BLE scan signal, and/or any other scan signal according tot any other wireless technology and/or protocol.

In some demonstrative aspects, the wireless signal 182 from the user device 180 may include a beacon signal.

For example, controller 124 may be configured to determine that the detected user device 180 is within the user detection range from the computing device 102, for example, based on detection of signal 182 including a beacon signal from user device 180. In one example, the beacon signal may include a BT beacon signal, and/or any other beacon signal according tot any other wireless technology and/or protocol.

In other aspects, the wireless signal 182 from the user device 180 may include any other type of signal, which may allow detection of user device 180 at the user detection range.

In some demonstrative aspects, controller 124 may be configured to set the user device information to identify a paired user device, which is paired with the computing device 102. For example, controller 124 may be configured to set the user device information to identify the paired user device as a user device of the user of computing device 102.

For example, controller 124 may be configured to update the user device information stored in memory 194 to identify a user device, for example, based on pairing of the user device, e.g., user device 180, with the computing device 102.

In one example, the pairing may include a BT pairing, e.g., according to a BT protocol and/or specification.

For example, controller 124 may be configured to update the user device information stored in memory 194 to include identification information to identify user device 180 as an identified user device of the user of computing device 102, for example, based on BT pairing of user device 180 with the computing device 102.

In some demonstrative aspects, controller 124 may be configured to determine whether a detected device is to be classified as a personal user device carried by the user of computing device 102, for example, based on at least one predefined classification criterion, e.g., as described below.

In some demonstrative aspects, controller 124 may be configured to set the user device information to include the detected device as part of the one or more user devices, for example, based on a determination that the detected device is to be classified as the personal user device carried by the user, e.g., as described below.

For example, controller 124 may detect device 180, and may determine whether device 180 is to be classified as a personal user device carried by the user of computing device 102. According to this example, controller 124 may update the user device information, e.g., in memory 194, to identify that device 180 is a personal user device carried by the user of computing device 102.

In some demonstrative aspects, the detection criterion may include a correlation between detections of the detected device and a proximity of the user to the computing device 102, e.g., as described below.

For example, controller 124 may determine whether device 180 is to be classified as a personal user device carried by the user of computing device 102 based on a correlation between one or more detections of device 180 and a proximity of the user to the computing device 102, e.g., at the detection of the device 180.

In one example, the correlation between detections of device 180 and detected instances of proximity of the user to the computing device 102 may indicate whether the device 180 is usually carried by the user of computing device 102.

In one example, a high correlation between detections of device 180 and detected instances of proximity of the user to the computing device 102 may indicate that device 180 is a personal user device carried by the user of computing device 102.

In some demonstrative aspects, the detection criterion may include a correlation between detections of the detected device and time periods in which the user interacts with the computing device 102, e.g., as described below.

For example, controller 124 may determine whether device 180 is to be classified as a personal user device carried by the user of computing device 102 based on a correlation between one or more detections of device 180 and one or more time periods in which the user interacts with the computing device 102.

In one example, the correlation between detections of device 180 and time periods in which the user interacts with the computing device 102 may indicate whether device 180 is usually carried by the user of computing device 102.

In one example, a high correlation between detections of device 180 and time periods in which the user interacts with the computing device 102 may indicate that device 180 is a personal user device carried by the user of computing device 102.

In other aspects, the detection criterion may include any other additional or alternative criteria to identify whether the detected device is a personal user device carried by the user of computing device 102.

In some demonstrative aspects, controller 124 may be configured to cause the computing device 102, e.g., to cause wireless sensing processor 110, to operate the wireless proximity sensing at a first accuracy level, for example, at a first wireless sensing rate, for example, when the computing device 102 is at the low power mode of operation.

In some demonstrative aspects, controller 124 may be configured to cause the computing device 102, e.g., to cause wireless sensing processor 110 to trigger the wireless proximity sensing at a second accuracy level, for example, at a second wireless sensing rate, for example, based on the determination that the user device is within the user detection range from the computing device 102, e.g., as described below.

In some demonstrative aspects, the second accuracy level may be higher than the first accuracy level. For example, the wireless proximity sensing at the first accuracy level may include wireless sending at a first wireless sensing rate, and the wireless proximity sensing at the second accuracy level may include wireless sending at a second wireless sensing rate, e.g., faster than the first wireless sensing rate, e.g., as described below.

For example, controller 124 may trigger WLAN sensing processor 110 to perform the wireless proximity sensing at the first accuracy level to maintain some capability of proximity sensing when device is at the low power mode, for example, with a reduced power consumption.

For example, based on the determination that the user device 180 is within the user detection range from the computing device 102, controller 124 may trigger WLAN sensing processor 110 to perform the wireless proximity sensing at the second accuracy level in order to be able to detect, with a higher level of accuracy, when the user is in the wakeup range from the computing device 102. This higher level of accuracy may allow reducing a probability of a false wake-up.

In some demonstrative aspects, controller 124 may be configured to trigger the computing device 102 to wakeup from the low power mode of operation to a power mode of operation sufficient to authenticate the user, for example, based on the detection that the user is within the wakeup range from the computing device 102.

In other aspects, controller 124 may be configured to trigger the computing device 102 to wakeup from the low power mode of operation to any other power mode of operation to support any other additional or alternative functionality of the computing device 102, e.g., based on the detection that the user is within the wakeup range from the computing device 102.

In some demonstrative aspects, controller 124 may be configured to determine whether the user device 180, e.g., which was detected based on the wireless signal 182, is still within the user detection range, for example, when the user is detected to be within the wakeup range from the computing device 102, e.g., based on the wireless proximity sensing performed by WLAN sensor 110.

For example, controller 124 may be configured to determine whether another wireless signal 182 is received from the user device 180, for example, when the user is detected to be within the wakeup range from the computing device 102, e.g., based on the wireless proximity sensing performed by WLAN sensor 110.

In some demonstrative aspects, the detection of user device 180 when the user is detected to be within the wakeup range from the computing device 102 may be used to determine, e.g., with a relatively high probability, that the person, which is detected based on the wireless proximity sensing performed by WLAN sensor 110 may probably be the same as the user carrying user device 180.

In some demonstrative aspects, the detection of user device 180 when the user is detected to be within the wakeup range from the computing device 102, may be utilized to authenticate the user, which is detected based on the wireless proximity sensing performed by WLAN sensor 110.

For example, the detection of user device 180 when the user is detected to be within the wakeup range from the computing device 102 may be utilized to automatically unlock the computing device 102, for example, as part of the "wake on human proximity" mechanism.

In some demonstrative aspects, controller 124 may be configured to determine a successful authentication of the user, for example, based on the determination that the user device 180 is still within the user detection range, for example, when the user is detected to be within the wakeup range from the computing device 102, e.g., based on the wireless proximity sensing performed by WLAN sensor 110.

In some demonstrative aspects, controller 124 may be configured to cause the computing device 102 to switch from a locked mode to an unlocked mode, for example, based on a determination that the user device 180 is still within the user detection range when the user is detected to be within the wakeup range from the computing device 102.

For example, controller 124 may be configured to cause the computing device 102 to switch from the locked mode to the unlocked mode, e.g., automatically, for example, even without requiring a further authentication of the user, e.g., via a login mechanism or any other authentication mechanism.

In other aspects, controller 124 may be configured to cause the computing device 102 to perform any other additional or alternative operation based on the determination that the user device 180 is still within the user detection range when the user is detected to be within the wakeup range from the computing device 102.

In some demonstrative aspects, a computing device, e.g., a PC, may detect that a user is in the vicinity of the computing device. For example, controller 124 may detect that a user is in the vicinity of computing device 102, for example, by detecting a smartphone or another personal device of the user, e.g., as described above.

In one example, the personal device of the user may be detected based on a BT signal received from the user device. For example, controller 124 may detect that a user is in the vicinity of computing device 102, for example, by detecting signal 182 from user device 180, e.g., as described above. In one example, a detection range based on the BT signals may be, for example, about 10 m, e.g., in "free space", or a few meters, e.g., in the case of intervening walls or cube materials.

In some demonstrative aspects, once the specific user device is detected, the computing device may initiate wireless proximity sensing, e.g., a Wi-Fi Sensing proximity service, for example, to determine if the user is within a perimeter defined as a "platform wakeup perimeter". For example, controller 124 may trigger wireless sensing processor 110 to perform the wireless proximity sensing, for example, based on detection of the user device 180, e.g., as described above.

In some demonstrative aspects, the computing device may be configured to maintain a list of "known" user devices, e.g., BLE devices and/or any other user devices, for example, in order to address use cases where not all users will pair their user devices, e.g., smartphones, to their computing device, e.g., their PC. For example, controller

124 may be configured to store and/or manage the list of user devices in memory 194, e.g., as described above.

In some demonstrative aspects, user devices may be detected, for example, by periodically scanning an environment of the computing device, for example, when the computing device is operating at S0 state, an active state, or any other power state supporting wireless scanning. For example, controller 124 may be configured to dynamically update the user device information in memory 194, for example, based on user devices detected during one or more wireless scans, e.g., as described above.

In some demonstrative aspects, controller 124 may be configured to dynamically update the list of "known" user devices, for example, based on possible correlation of the detected user devices to one or more wake/login events, for example, to filter out user devices, e.g., a BLE keyboard or mouse, that are "always there", but do not represent person proximity.

In some demonstrative aspects, controller 124 may be configured to dynamically manage the user device information to identify user devices associated with, e.g., carried by or worn by, the user of computing device 102, e.g., the user's smartphone or smart/connected wearable device, e.g., as described below.

In some demonstrative aspects, controller 124 may be configured to maintain a list of discoverable devices, e.g., BLE devices, which may be detected when computing device 102 is in the awake state, e.g., when device 102 is in the S0 state.

In some demonstrative aspects, controller 124 may be configured to selectively "weed out" from the list of known device one or more devices that are not always or not mostly detected by the computing device 102 when computing device 102 is in the awake state. For example, devices, which are not usually detected when computing device 102 is in the awake state, may be assumed to be devices belonging to other people, e.g., family members and/or co-workers. Such devices may be discoverable by computing device 102 in some environments but not in all environments.

In some demonstrative aspects, controller 124 may be configured to dynamically manage wireless proximity sensing, for example, according to a selective wireless proximity sensing mechanism, which may account for a user replacing one or more of the user's devices, and/or to account for an occasional instance where the user is not carrying a user device when interacting with computing device 102, e.g., as described below.

In some demonstrative aspects, controller 124 may be configured to cause WLAN sensor 110 to periodically perform wireless proximity sensing, for example, to sense a Wi-Fi environment for proximity, for example, at a low duty cycle. For example, the low duty cycle wireless proximity sensing may be performed, e.g., regardless of whether or not proximity of a users' device is detected.

In some demonstrative aspects, controller 124 may be configured to trigger a platform wake of computing device 102, for example, based on Wi-Fi proximity detection, e.g., by WLAN sensor 110, following a BLE proximity detection, e.g., based on wireless signal 182 form user device 180.

In one example, a "cost", e.g., in terms of power consumption, of waking up the computing device 102 due to false user detection may be prohibitive.

Accordingly, in some demonstrative aspects, a first platform wake procedure of computing device 102 may be performed upon Wi-Fi proximity detection, e.g., without BLE proximity detection; and/or a second platform wake procedure of computing device 102 may be performed upon the Wi-Fi proximity detection following the BLE proximity detection.

For example, the second platform wake may be more aggressive than the first platform wake, for example, since there may be a relatively high probability that a user detected by the wireless proximity sensing following the BLE proximity detection is indeed the user of device 180, and accordingly, the user of device 102.

In some demonstrative aspects, a wake up aggressiveness level of waking up the computing device 102 may be based, for example, on one or more criteria corresponding to the detection of the user device 180.

In one example, the wake up aggressiveness level of waking up the computing device 102 may be based on an estimated user distance of the user from the computing device 102.

In another example, the wake up aggressiveness level of waking up the computing device 102 may be based on an estimated user movement direction of the user relative to the computing device 102.

In another example, the wake up aggressiveness level of waking up the computing device 102 may be based on user gait detection, which may be performed, for example, based on multiple analysis, e.g., using the channel estimation measurements performed by wireless sensor 110. For example, the user gait detection may provide accurate detection of a specific person, for example, using multiple consecutive measurements.

In some demonstrative aspects, controller 124 may be configured to maintain and/or update the user device information, for example, to support efficient and/or accurate "personal device" identification and/or maintenance, e.g., as described below.

In some demonstrative aspects, controller 124 may be configured to identify a user device as a user "personal device", for example, when the user of device 102 pairs the user device to the computing device 102. For example, the personal user device may include a smartphone, a headset, smartwatch, or the like.

In some demonstrative aspects, controller 124 may be configured to maintain a first list of devices ("known personal devices"), a second list of devices ("known other devices"), and/or a third list of devices ("new devices"), e.g., as described below.

In some demonstrative aspects, controller 124 may be configured to manage the list of "known personal devices" and/or the list of "new devices" according to a "device rank" metric, e.g., per device, as described below.

In some demonstrative aspects, controller 124 may register in the list of "new devices" a new device, which is detected by device 102, for example, in conjunction with a platform wake or login state of device 102. For example, the new device may be ranked, e.g., with a device rank "+1".

In some demonstrative aspects, controller 124 may promote a rank of a "personal device", e.g., in the list of known personal devices, for example, based on detection of the "personal device in conjunction with a platform wake or log-in state of device 102. For example, the rank of the "personal device" may be promoted by increasing ("+1") the device rank.

In some demonstrative aspects, controller 124 may demote a particular device, for example, when a scan, e.g., a BLE scan, that is performed in conjunction with a platform wake or log-in state of device 102 results with not finding the particular device in the list of "new devices" or the list of "known devices". For example, the particular device may be demoted by decreasing ("–1") the device rank of the particular device in the list of "new devices" or the list of "known personal devices".

In some demonstrative aspects, controller 124 may promote a device from the list of "new devices" to the list of "known personal devices", for example, when a device rank of the device passes a first certain rank, e.g., a positive rank.

In some demonstrative aspects, controller 124 may demote a device from the list of "new devices" to the list of "known other devices", for example, when a device rank of the device passes a second certain rank, e.g., a negative rank.

In some demonstrative aspects, controller 124 may demote a device from the list of "known personal devices" to the list of "new devices", for example, when a device rank of the device passes a third certain rank.

In some demonstrative aspects, controller 124 may move a new device from the list of "new devices" to the list of the "known other devices", for example, based on multiple device detections of a new device that are not in conjunction with a platform wake or log-in. For example, such detections may indicate that the new device is not a personal device carried by the user. For example, it may be expected that a BLE mouse will be detected near a computing platform, e.g., regardless of platform wake or login events.

In some demonstrative aspects, controller 124 may be configured to maintain and/or update the user device information, for example, according to a Machine Learning (ML) scheme, e.g., as described below.

In some demonstrative aspects, the ML scheme may be defined with respect to a plurality of inputs, e.g., including a "detected BLE device ID" corresponding to an identifier of a detected device; a "Location Indicator" corresponding to a location of the detected device the, e.g. a Wi-Fi AP device 102 is associated with; one or more platform wakeup and login events during which the detected device is detected by device 102; a timestamp of a detection of the detected device, and/or any other input.

In one example, a location may be defined as a "set of location IDs" that have some correlation, e.g. same Wi-Fi AP profile, time lag between detection of a new AP ID and last "location" AP ID is smaller than some threshold, e.g. 5 seconds. In one example, for example, for training purposes, an additional input designating the location ID may be provided.

One example of a training method may define that BLE devices that can be found in just one location and not in other locations are considered as "not personal devices", and/or that BLE devices that are found in "all locations" are considered as "personal devices". For example, "personal devices" can be found only intermittently in some of the locations, e.g., if a user leaves a smartphone in another room at home, or in conjunction with platform wake-up and/or login events.

In other aspects, any other ML scheme may be implemented.

Figure 2:
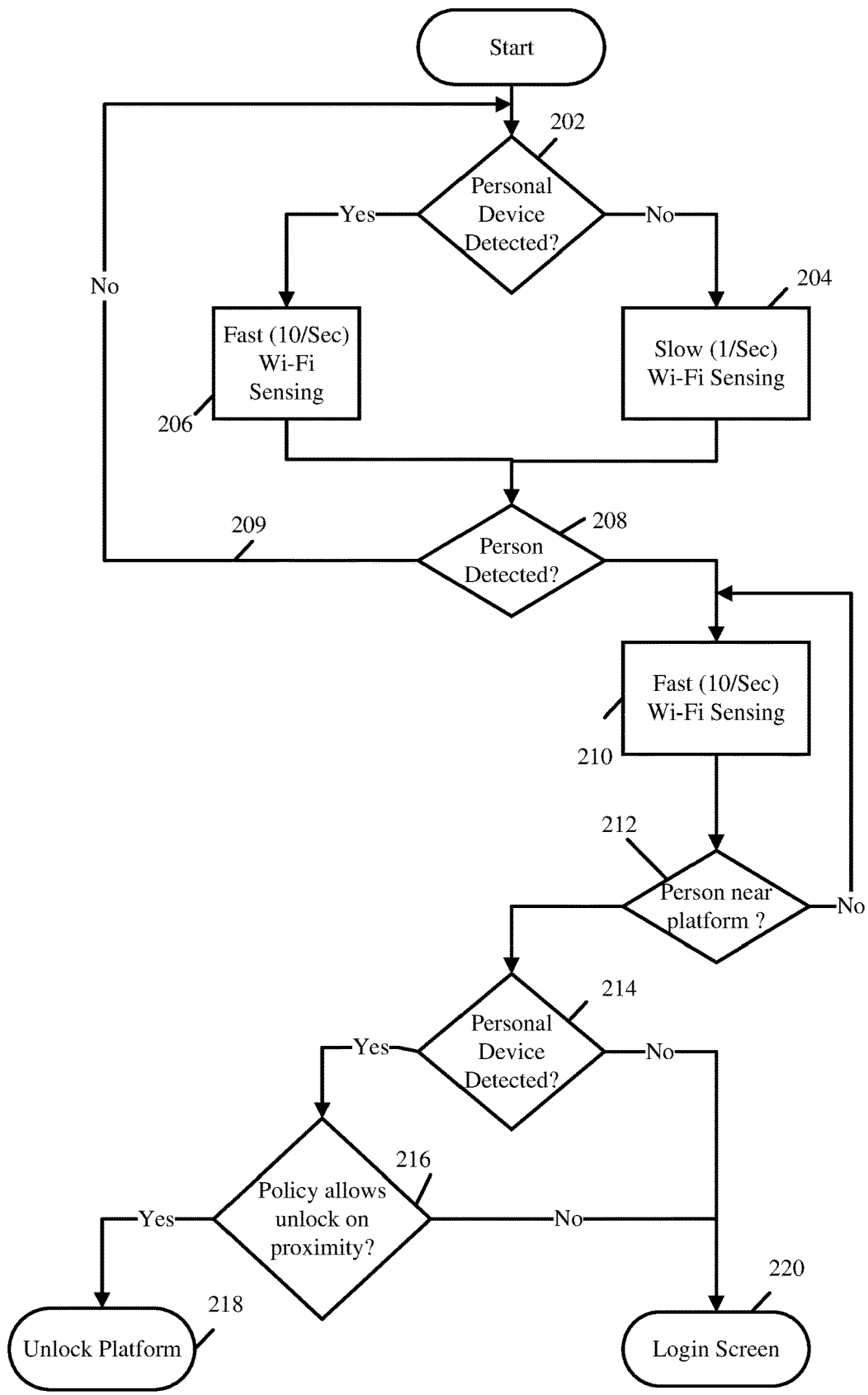
FIG. 2 is a schematic flow-chart illustration of a method of waking up a computing device based on wireless sensing, in accordance with some demonstrative aspects.

FIG. 2 is a schematic flow-chart illustration of a method of waking up a computing device based on wireless sensing, in accordance with some demonstrative aspects. For example, a computing device, e.g., computing device 102 (FIG. 1), may be configured to perform, and/or a controller, e.g., controller 124 (FIG. 1), may be configured to cause a device, e.g., device 102 (FIG. 1), to perform one or more of the operations of FIG. 2.

As indicated at block 202, the method may include determining whether a personal user device of a user of a computing device is detected. For example, controller 124 (FIG. 1) may be configured to determine whether user device 180 (FIG. 1) is detected based on wireless signal 182 (FIG. 1), e.g., as described above.

As indicated at block 204, the method may include operating a wireless proximity sensing at a first rate, e.g., a slow rate, for example, if a personal user device of the user is not detected. For example, controller 124 (FIG. 1) may be configured to cause wireless sensing processor 110 (FIG. 1) to perform the wireless proximity sensing at the first rate, for example, if user device 180 (FIG. 1) is not detected, e.g., as described above.

As indicated at block 206, the method may include operating the wireless proximity sensing at a second rate, e.g., a fast rate, for example, if the personal user device of the user is detected. For example, controller 124 (FIG. 1) may be configured to cause wireless sensing processor 110 (FIG. 1) to perform the wireless proximity sensing at the second rate, for example, if user device 180 (FIG. 1) is detected, e.g., as described above.

As indicated at block 208, the method may include determining whether a person is detected, for example, based on the wireless proximity sensing. For example, controller 124 (FIG. 1) may be configured to determine whether a person is detected, for example, based on the wireless proximity sensing by wireless sensor 110 (FIG. 1), e.g., as described above.

In some demonstrative aspects, as shown by arrow 209, the method may include returning to determining whether a personal user device of a user of a computing device is detected, for example, if the person is not detected by the wireless proximity sensing.

As indicated at block 210, the method may include operating the wireless proximity sensing at an increased rate, for example, the second rate or any other rate, to detect proximity of the person to device 102, for example, if the person is detected at block 208.

As indicated at block 212, the method may include determining whether a person is detected in proximity to the computing device, for example, based on the wireless proximity sensing. For example, controller 124 (FIG. 1) may be configured to determine whether a person is detected in proximity to device 102 (FIG. 1), for example, based on the wireless proximity sensing by wireless sensor 110 (FIG. 1), e.g., as described above.

As indicated at block 214, the method may include determining whether the personal user device is detected, for example, when the person is detected in proximity to the computing device. For example, controller 124 (FIG. 1) may be configured to determine whether user device 180 (FIG. 1) is detected, e.g., based on signal 182 (FIG. 1), for example, when the person is detected in proximity to device 102 (FIG. 1), for example, based on the wireless proximity sensing by wireless sensor 110 (FIG. 1), e.g., as described above.

As indicated at block 216, the method may include determining whether it is allowed to unlock the computing device based on the detected proximity of the person and the personal user device. For example, controller 124 (FIG. 1) may be configured, e.g., according to one or more policies, to selectively allow unlocking of computing device 102 (FIG. 1) based on detection of user device 180 (FIG. 1) when proximity of a person is detected, for example, based on the wireless proximity sensing, e.g., as described above.

As indicated at block 218, the method may include unlocking the computing device, for example, based on the detected proximity of the person and the personal user device. For example, controller 124 (FIG. 1) may be configured to trigger unlocking of computing device 102 (FIG. 1), for example, based on detection of user device 180 (FIG.

1) when proximity of a person is detected, for example, based on the wireless proximity sensing, e.g., as described above.

As indicated at block 220, the method may include waking up the computing device to allow logging into the computing device, for example, based on the detected proximity of the person while the personal user device is not detected, or if the unlocking is not allowed. For example, controller 124 (FIG. 1) may be configured to trigger waking up computing device 102 (FIG. 1), for example, to a power mode sufficient to display a login screen and/or to allow logging into computing device 102 (FIG. 1), e.g., as described above.

Figure 3:
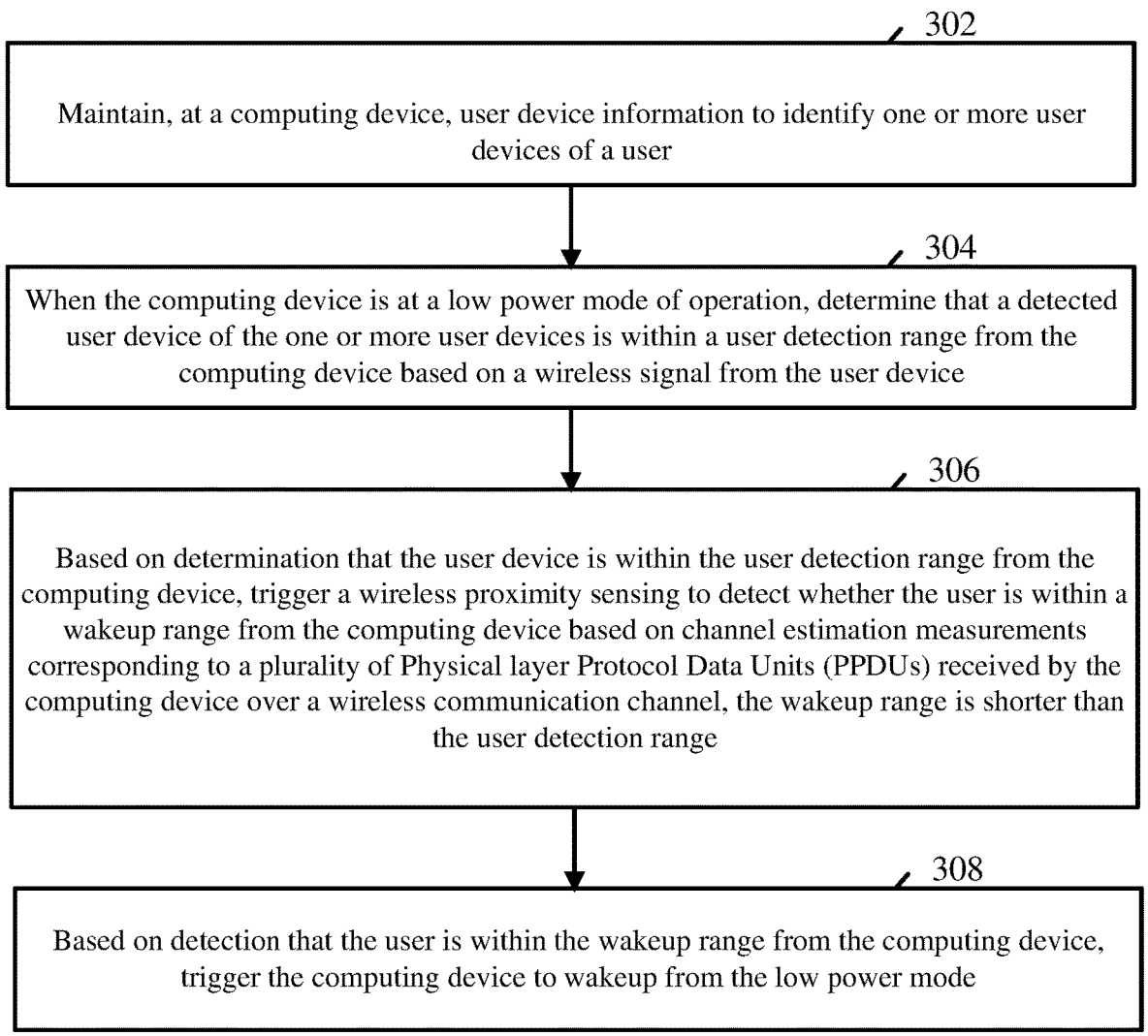
FIG. 3 is a schematic flow-chart illustration of a method of waking up a computing device based on wireless sensing, in accordance with some demonstrative aspects.

FIG. 3 is a schematic flow-chart illustration of a method of waking up a computing device based on wireless sensing, in accordance with some demonstrative aspects. For example, a computing device, e.g., computing device 102 (FIG. 1), may be configured to perform, and/or a controller, e.g., controller 124 (FIG. 1), may be configured to cause a device, e.g., device 102 (FIG. 1), to perform one or more of the operations of FIG. 3.

As indicated at block 302, the method may include maintaining, at a computing device, user device information to identify one or more user devices of a user. For example, controller 124 (FIG. 1) may maintain, e.g., in memory 194 (FIG. 1), user device information to identify one or more user devices of a user of computing device 102 (FIG. 1), e.g., as described above.

As indicated at block 304, the method may include, when the computing device is at a low power mode of operation, determining that a detected user device of the one or more user devices is within a user detection range from the computing device based on a wireless signal from the user device. For example, when computing device 102 (FIG. 1) is at the low power mode, controller 124 (FIG. 1) may detect that user device 180 (FIG. 1) is within the user detection range from the computing device 102 (FIG. 1), for example, based on a wireless signal 182 (FIG. 1) from the user device 80 (FIG. 1), e.g., as described above.

As indicated at block 306, the method may include triggering, based on determination that the user device is within the user detection range from the computing device, a wireless proximity sensing to detect whether the user is within a wakeup range from the computing device based on channel estimation measurements corresponding to a plurality of PPDUs received by the computing device over a wireless communication channel, the wakeup range is shorter than the user detection range. For example, controller 124 (FIG. 1) may trigger the wireless proximity sensing by WLAN sensor 110 (FIG. 1), for example, based on the determination that the user device 180 (FIG. 1) is within the user detection range from the computing device 102 (FIG. 1), e.g., as described above.

As indicated at block 308, the method may include triggering the computing device to wakeup from the low power mode, for example, based on detection that the user is within the wakeup range from the computing device. For example, controller 124 (FIG. 1) may trigger computing device 102 (FIG. 1) to wakeup from the low power mode, for example, based on detection that the user is within the wakeup range from the computing device 102 (FIG. 1), e.g., as described above.

Figure 4:
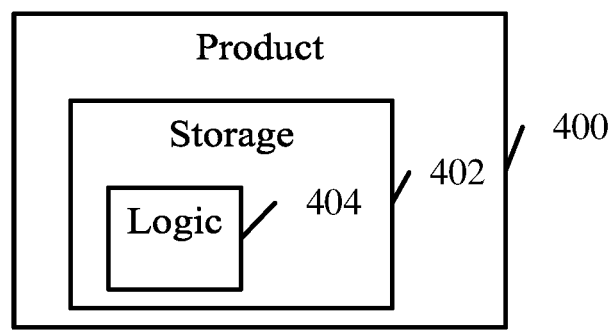
FIG. 4 is a schematic illustration of a product of manufacture, in accordance with some demonstrative aspects.

Reference is made to FIG. 4, which schematically illustrates a product of manufacture 400, in accordance with some demonstrative aspects. Product 400 may include one or more tangible computer-readable ("machine-readable") non-transitory storage media 402, which may include computer-executable instructions, e.g., implemented by logic 404, operable to, when executed by at least one computer processor, enable the at least one computer processor to implement one or more operations at device 102 (FIG. 1), wireless sensing component 110 (FIG. 1), controller 124 (FIG. 1), and/or message processor 128 (FIG. 1); to cause device 102 (FIG. 1), wireless sensing component 110 (FIG. 1), controller 124 (FIG. 1), and/or message processor 128 (FIG. 1) to perform, trigger and/or implement one or more operations and/or functionalities, and/or to perform, trigger and/or implement one or more operations and/or functionalities, described with reference to the FIGS. 1, 2, and/or 3, and/or one or more operations described herein. The phrases "non-transitory machine-readable medium" and "computer-readable non-transitory storage media" may be directed to include all computer-readable media, with the sole exception being a transitory propagating signal.

In some demonstrative aspects, product 400 and/or machine-readable storage media 402 may include one or more types of computer-readable storage media capable of storing data, including volatile memory, non-volatile memory, removable or non-removable memory, erasable or non-erasable memory, writeable or rewriteable memory, and the like. For example, machine-readable storage media 402 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 404 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 404 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes an apparatus comprising logic and circuitry configured to cause a computing device to maintain user device information to identify one or more user devices of a user; when the computing device is at a low power mode of operation, determine that a detected user device of the one or more user devices is within a user detection range from the computing device based on a wireless signal from the user device; based on determination that the user device is within the user detection range from the computing device, trigger a wireless proximity sensing to detect whether the user is within a wakeup range from the computing device based on channel estimation measurements corresponding to a plurality of Physical layer Protocol Data Units (PPDUs) received by the computing device over a wireless communication channel, the wakeup range is shorter than the user detection range; and based on detection that the user is within the wakeup range from the computing device, trigger the computing device to wakeup from the low power mode.

Example 2 includes the subject matter of Example 1, and optionally, wherein the apparatus is configured to set the user device information to identify a paired user device, which is paired with the computing device.

Example 3 includes the subject matter of Example 1 or 2, and optionally, wherein the apparatus is configured to determine whether a detected device is to be classified as a personal user device carried by the user based on at least one predefined classification criterion, and to set the user device information to include the detected device in the one or more user devices based on a determination that the detected device is to be classified as the personal user device carried by the user.

Example 4 includes the subject matter of Example 3, and optionally, wherein the detection criterion comprises a correlation between detections of the detected device and a proximity of the user to the computing device.

Example 5 includes the subject matter of Example 3 or 4, and optionally, wherein the detection criterion comprises a correlation between detections of the detected device and time periods in which the user interacts with the computing device.

Example 6 includes the subject matter of any one of Examples 1-5, and optionally, wherein the apparatus is configured to cause the computing device to operate the wireless proximity sensing at a first accuracy level when the computing device is at the low power mode of operation, and, based on the determination that the user device is within the user detection range from the computing device, trigger the wireless proximity sensing at a second accuracy level, the second accuracy level higher than the first accuracy level.

Example 7 includes the subject matter of any one of Examples 1-6, and optionally, wherein the apparatus is configured to, based on detection that the user is within the wakeup range from the computing device, trigger the computing device to wakeup from the low power mode of operation to a power mode of operation sufficient to authenticate the user.

Example 8 includes the subject matter of any one of Examples 1-7, and optionally, wherein the apparatus is configured to trigger the computing device to switch from a locked mode to an unlocked mode based on a determination that the user device is still within the user detection range when the user is detected to be within the wakeup range from the computing device.

Example 9 includes the subject matter of any one of Examples 1-8, and optionally, wherein the apparatus is configured to determine a successful authentication of the user based on a determination that the user device is still within the user detection range when the user is detected to be within the wakeup range from the computing device.

Example 10 includes the subject matter of any one of Examples 1-9, and optionally, wherein the plurality of PPDUs comprises a plurality of PPDUs received from one or more other devices, different from the user device.

Example 11 includes the subject matter of any one of Examples 1-10, and optionally, wherein the user detection range comprises a range of at least 3 meters (m), and the wakeup range comprises a range of no more than 2 m.

Example 12 includes the subject matter of any one of Examples 1-11, and optionally, wherein the wakeup range comprises a range of no more than 1 meter.

Example 13 includes the subject matter of any one of Examples 1-12, and optionally, wherein the wireless signal from the user device comprises a scan signal or a beacon signal.

Example 14 includes the subject matter of any one of Examples 1-13, and optionally, wherein the wireless signal comprises a wireless signal received by a first radio of the computing device, and the plurality of PPDUs comprises PPDUs received by a second radio of the computing device.

Example 15 includes the subject matter of any one of Examples 1-14, and optionally, wherein the wireless signal comprises a Bluetooth (BT) signal received by a BT radio of the computing device, and the plurality of PPDUs comprises Wireless Local Area Network (WLAN) PPDUs received by a WLAN radio of the computing device.

Example 16 includes the subject matter of any one of Examples 1-15, and optionally, wherein the apparatus is configured to determine that the detected user device is within the user detection range from the computing device according to a Bluetooth Low Energy (BLE) transmission from the user device Example 17 includes the subject matter of any one of Examples 1-16 comprising one or more radios to receive the wireless signal and the plurality of PPDUs, one or more antennas connected to the one or more radios, and a processor to execute instructions of an operating system of the computing device.

Example 18 comprises an apparatus comprising means for executing any of the described operations of Examples 1-17.

Example 19 comprises a product comprising one or more tangible computer-readable non-transitory storage media comprising computer-executable instructions operable to, when executed by at least one processor, enable the at least one processor to cause a computing device to perform any of the described operations of Examples 1-17.

Example 20 comprises an apparatus comprising: a memory interface; and processing circuitry configured to: perform any of the described operations of Examples 1-17.

Example 21 comprises a method comprising any of the described operations of Examples 1-17.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising logic and circuitry configured to cause a computing device to:
maintain user device information to identify one or more user devices of a user;
when the computing device is at a low power mode of operation, determine that a detected user device of the one or more user devices is within a user detection range from the computing device based on a wireless signal from the user device;
based on determination that the user device is within the user detection range from the computing device, trigger a wireless proximity sensing to detect whether the user is within a wakeup range from the computing device based on channel estimation measurements corresponding to a plurality of Physical layer Protocol Data Units (PPDUs) received by the computing device over a wireless communication channel, the wakeup range is shorter than the user detection range; and
based on detection that the user is within the wakeup range from the computing device, trigger the computing device to wakeup from the low power mode of operation.

2. The apparatus of claim 1 configured to set the user device information to identify a paired user device, which is paired with the computing device.

3. The apparatus of claim 1 configured to determine whether a detected device is to be classified as a personal user device carried by the user based on at least one predefined classification criterion, and to set the user device information to include the detected device in the one or more user devices based on a determination that the detected device is to be classified as the personal user device carried by the user.

4. The apparatus of claim 3, wherein the detection criterion comprises a correlation between detections of the detected device and a proximity of the user to the computing device.

5. The apparatus of claim 3, wherein the detection criterion comprises a correlation between detections of the detected device and time periods in which the user interacts with the computing device.

6. The apparatus of claim 1 configured to cause the computing device to operate the wireless proximity sensing at a first accuracy level when the computing device is at the low power mode of operation, and, based on the determination that the user device is within the user detection range from the computing device, trigger the wireless proximity sensing at a second accuracy level, the second accuracy level higher than the first accuracy level.

7. The apparatus of claim 1 configured to, based on detection that the user is within the wakeup range from the computing device, trigger the computing device to wakeup from the low power mode of operation to a power mode of operation sufficient to authenticate the user.

8. The apparatus of claim 1 configured to trigger the computing device to switch from a locked mode to an unlocked mode based on a determination that the user device is still within the user detection range when the user is detected to be within the wakeup range from the computing device.

9. The apparatus of claim 1 configured to determine a successful authentication of the user based on a determination that the user device is still within the user detection range when the user is detected to be within the wakeup range from the computing device.

10. The apparatus of claim 1, wherein the plurality of PPDUs comprises a plurality of PPDUs received from one or more other devices, different from the user device.

11. The apparatus of claim 1, wherein the user detection range comprises a range of at least 3 meters (m), and the wakeup range comprises a range of no more than 2 m.

12. The apparatus of claim 1, wherein the wakeup range comprises a range of no more than 1 meter.

13. The apparatus of claim 1, wherein the wireless signal from the user device comprises a scan signal or a beacon signal.

14. The apparatus of claim 1, wherein the wireless signal comprises a wireless signal received by a first radio of the computing device, and the plurality of PPDUs comprises PPDUs received by a second radio of the computing device.

15. The apparatus of claim 1, wherein the wireless signal comprises a Bluetooth (BT) signal received by a BT radio of the computing device, and the plurality of PPDUs comprises Wireless Local Area Network (WLAN) PPDUs received by a WLAN radio of the computing device.

16. The apparatus of claim 1 configured to determine that the detected user device is within the user detection range from the computing device according to a Bluetooth Low Energy (BLE) transmission from the user device.

17. The apparatus of claim 1 comprising one or more radios to receive the wireless signal and the plurality of PPDUs, one or more antennas connected to the one or more radios, and a processor to execute instructions of an operating system of the computing device.

18. A computing device comprising:
one or more radios;
one or more antennas connected to the one or more radios;
a memory; and
a controller configured to:
maintain in the memory user device information to identify one or more user devices of a user;
when the computing device is at a low power mode of operation, determine that a detected user device of the one or more user devices is within a user detection range from the computing device based on a wireless signal from the user device;
based on determination that the user device is within the user detection range from the computing device, trigger a wireless proximity sensing to detect whether the user is within a wakeup range from the computing device based on channel estimation measurements corresponding to a plurality of Physical layer Protocol Data Units (PPDUs) received by the computing device over a wireless communication channel, the wakeup range is shorter than the user detection range; and
based on detection that the user is within the wakeup range from the computing device, trigger the computing device to wakeup from the low power mode.

19. The computing device of claim 18, wherein the controller is configured to cause the computing device to operate the wireless proximity sensing at a first accuracy level when the computing device is at the low power mode of operation, and, based on the determination that the user device is within the user detection range from the computing device, trigger the wireless proximity sensing at a second accuracy level, the second accuracy level higher than the first accuracy level.

20. The computing device of claim 18, wherein the one or more radios comprise a Bluetooth (BT) radio to receive a BT signal comprising the wireless signal, and a Wireless Local Area Network (WLAN) radio to receive a plurality of WLAN PPDUs comprising the plurality of PPDUs.

21. A product comprising one or more tangible computer-readable non-transitory storage media comprising computer-executable instructions operable to, when executed by at least one processor, enable the at least one processor to cause a computing device to:

maintain user device information to identify one or more user devices of a user;

when the computing device is at a low power mode of operation, determine that a detected user device of the one or more user devices is within a user detection range from the computing device based on a wireless signal from the user device;

based on determination that the user device is within the user detection range from the computing device, trigger a wireless proximity sensing to detect whether the user is within a wakeup range from the computing device based on channel estimation measurements corresponding to a plurality of Physical layer Protocol Data Units (PPDUs) received by the computing device over a wireless communication channel, the wakeup range is shorter than the user detection range; and based on detection that the user is within the wakeup range from the computing device, trigger the computing device to wakeup from the low power mode.

22. The product of claim 21, wherein the instructions, when executed, cause the computing device to operate the wireless proximity sensing at a first accuracy level when the computing device is at the low power mode of operation, and, based on the determination that the user device is within the user detection range from the computing device, trigger the wireless proximity sensing at a second accuracy level, the second accuracy level higher than the first accuracy level.

23. The product of claim 21, wherein the instructions, when executed, trigger the computing device to, based on detection that the user is within the wakeup range from the computing device, wakeup from the low power mode of operation to a power mode of operation sufficient to authenticate the user.

24. The product of claim 21, wherein the instructions, when executed, trigger the computing device to switch from a locked mode to an unlocked mode based on a determination that the user device is still within the user detection range when the user is detected to be within the wakeup range from the computing device.

25. The product of claim 21, wherein the instructions, when executed, cause the computing device to determine a successful authentication of the user based on a determination that the user device is still within the user detection range when the user is detected to be within the wakeup range from the computing device.

* * * * *